United States Patent
Mcclurkin, Jr.

(10) Patent No.: US 11,242,838 B2
(45) Date of Patent: Feb. 8, 2022

(54) INCREASING MECHANICAL ADVANTAGE THROUGH THE USE OF A ROTATING LIQUID

(71) Applicant: John B. Mcclurkin, Jr., Frederick, MD (US)

(72) Inventor: John B. Mcclurkin, Jr., Frederick, MD (US)

(73) Assignee: Werlpower, LLC, Las Vegas, NV (US)

( * ) Notice: Subject to any disclaimer, the term of this patent is extended or adjusted under 35 U.S.C. 154(b) by 0 days.

(21) Appl. No.: 16/835,886

(22) Filed: Mar. 31, 2020

(65) Prior Publication Data

US 2020/0309086 A1    Oct. 1, 2020

Related U.S. Application Data

(60) Provisional application No. 62/919,821, filed on Apr. 1, 2019.

(51) Int. Cl.
*F03B 17/06* (2006.01)

(52) U.S. Cl.
CPC .................................. *F03B 17/063* (2013.01)

(58) Field of Classification Search
CPC .................................................... F03B 17/063
USPC .................................................... 290/43, 54
See application file for complete search history.

(56) References Cited

U.S. PATENT DOCUMENTS

| | | | | |
|---|---|---|---|---|
| 2,235,672 A * | 3/1941 | Dodge | .................... | F16H 61/56 60/345 |
| 2,256,018 A * | 9/1941 | Custer | .................... | F16D 33/00 192/58.3 |
| 2,310,178 A * | 2/1943 | Jauch | ........................ | F04D 5/00 415/49 |
| 2,368,437 A * | 1/1945 | Alexandrescu | ......... | F16D 33/00 192/58.3 |
| 2,603,103 A * | 7/1952 | Sohon | .................... | F16F 15/31 74/573.1 |
| 2,963,867 A * | 12/1960 | Amiard | .................... | F16H 41/26 60/345 |
| 2,964,963 A * | 12/1960 | Fischer | .................... | F16H 61/56 477/66 |
| RE24,947 E * | 3/1961 | Kelley | .................... | F16H 47/08 475/39 |
| 2,999,400 A * | 9/1961 | Kelley | .................... | F16H 61/56 477/66 |
| 3,002,356 A * | 10/1961 | Black | ...................... | F16H 41/26 60/361 |
| 3,005,359 A * | 10/1961 | Karl | ........................ | F16H 61/62 475/44 |
| 3,248,967 A * | 5/1966 | Lewis | .................... | F16F 15/31 74/573.11 |
| 3,930,745 A * | 1/1976 | Gassie | ...................... | F04D 5/00 415/141 |
| 4,246,753 A * | 1/1981 | Redmond | ............... | F03B 13/00 60/398 |

(Continued)

*Primary Examiner* — Pedro J Cuevas
(74) *Attorney, Agent, or Firm* — The Law Office of Kevin Mc Dermott, P.L.L.C.

(57) ABSTRACT

The disclosed invention is a description of the means to create increased mechanical advantage by taking advantage of the rotation of confined liquid matter. The process described uses liquid both as a mass to store rotational energy, and at the same time the rotating liquid is used as a motive force to drive a rotating shell. A description of the process and one possible embodiment are presented.

9 Claims, 3 Drawing Sheets

(56) References Cited

U.S. PATENT DOCUMENTS

| | | | | |
|---|---|---|---|---|
| 4,335,627 | A * | 6/1982 | Maxwell | F16D 33/08 180/165 |
| 4,551,631 | A * | 11/1985 | Trigilio | F03D 3/0409 290/55 |
| 4,735,382 | A * | 4/1988 | Pinson | B64G 1/426 244/150 |
| 5,083,899 | A * | 1/1992 | Koch | F03D 9/12 415/2.1 |
| 5,086,664 | A * | 2/1992 | Wagner | F16H 33/02 475/111 |
| 5,263,814 | A * | 11/1993 | Jang | F01D 1/24 415/63 |
| 5,490,436 | A * | 2/1996 | Coyne | F16F 15/366 464/180 |
| 6,765,308 | B1 * | 7/2004 | Kazanjian | F03B 13/00 290/43 |
| 6,883,399 | B2 * | 4/2005 | Burstall | F16F 15/31 74/573.1 |
| 7,242,108 | B1 * | 7/2007 | Dablo | F03D 9/12 290/55 |
| 7,288,850 | B2 * | 10/2007 | Hicks | F03D 9/11 290/44 |
| 8,063,502 | B1 * | 11/2011 | Voyles | F03D 3/005 290/55 |
| 8,310,078 | B2 * | 11/2012 | Shreider | F03B 17/065 290/54 |
| 8,314,508 | B2 * | 11/2012 | Kawas | F03D 9/25 290/55 |
| 8,362,637 | B2 * | 1/2013 | Kawas | H02S 10/12 290/55 |
| 9,048,705 | B2 * | 6/2015 | Ko | F03D 3/0454 |
| 9,618,002 | B1 * | 4/2017 | Cabra | F03B 13/00 |
| 10,815,962 | B1 * | 10/2020 | Lu | H02K 7/1823 |
| 10,899,217 | B2 * | 1/2021 | Dugas | B60K 6/105 |
| 2009/0033162 | A1 * | 2/2009 | Dugas | H02K 7/025 310/74 |
| 2010/0189553 | A1 * | 7/2010 | Yoo | F03D 3/0481 415/183 |
| 2011/0140450 | A1 * | 6/2011 | Kawas | F03D 3/0427 290/55 |
| 2011/0259143 | A1 * | 10/2011 | Murphy | H02K 7/025 74/572.2 |
| 2020/0347816 | A1 * | 11/2020 | Mcclurkin, Jr. | F03B 13/00 |

* cited by examiner

INCREASING MECHANICAL ADVANTAGE THROUGH THE USE OF A ROTATING LIQUID

CLAIM OF PRIORITY

The present application claims priority to and incorporates by reference U.S. Provisional Application No. 62/919,821 filed Apr. 1, 2019, entitled "Increasing Mechanical Advantage Through the Use of a Rotating Liquid."

BACKGROUND OF THE INVENTION

The present disclosure relates generally to the field of kinetic energy transfer originating in the form of rotational energy storage which is transferred by mechanical means to perform useful work. Flywheels and waterwheels are the most similar examples as the current invention incorporates features of both, but in a novel fashion allowing useful work to be done.

Flywheels and water wheels have been used for storing and transferring mechanical energy for hundreds of years. The water wheel was the first source of large scale power for the industrial revolution while high strength high speed flywheels are currently being proposed as the "mechanical battery" to store energy from renewable energy sources.

In the case of water wheels, a source of flowing water is used to impart movement to a rotating wheel mass that accumulates the energy from the water flow as rotational energy. For water wheels, all of the mechanical force to rotate the wheel comes from the flowing water and all of the rotational energy is stored in the mass of the wheel. Water wheels are generally lower RPM devices with a large mass in the wheel. Water wheels are limited because it is difficult to have a large enough mass to increase energy storage because increasing the mass only increases the energy storage in a linear progression. Another difficulty with a large solid mass is the energy required to start the wheel in motion may not be available if the mass of the wheel is too great.

Modern flywheels contain substantial mass but generally obtain their maximum energy storage by being spun at extremely high RPMs, in some cases up to 50,000 RPM. High RPMs is a preferred method for flywheels because the energy stored increases with the square of the velocity increase. But such high rotational velocities require the use of expensive composite materials, magnetic bearings, vacuum chambers and extensive safety measures in case of catastrophic failure.

Methods for increasing mass for storing rotational energy are known. For example, U.S. Patent Application Publication No. 2011/0259143 A1 describes a method in which water is used for increasing the mass of the flywheel so larger amounts of rotational energy can be stored, but the water only works as mass and rotational energy is increased by external mechanical means only. Another example is U.S. Patent Application Publication No. 2009/0033162 A1 which uses a rotating flywheel to add energy to the liquid surrounding it for energy storage.

Internationally, several water powered generators use water to turn the generator and increase the effect of the water by having it circle around a vortex shaped container and then exit out the bottom. In these applications, the water flows through the container only once and no effort is made to use the water to increase the available mass for storing more rotational energy.

BRIEF SUMMARY OF THE INVENTION

The present invention uses liquid that is contained and rotated.

Rather than have the liquid simply flow through the container, effort is made to retain as much of the liquid as feasible and increase its rotational velocity. For this reason, the outlet for the liquid is specifically placed above the level of the input.

In the current process described, energy is continuously input in the form of work done on the contained liquid to cause continuous rotation at the same rotational velocity, while simultaneously mechanical energy is continuously extracted in the form of a rotating shaft.

Another advantage with the present invention is if it is a large liquid mass, it is not necessary to set the entire mass in rotation "all at once" as is the case with a single solid mass. Parts of the liquid will begin flowing and as the work done on the system continues, eventually all of the contained liquid will be rotating uniformly.

BRIEF DESCRIPTION OF THE ACCOMPANYING DRAWINGS

The present invention will be explained below by means of non-limiting examples with reference to the accompanying drawings.

DETAILED DESCRIPTION OF THE INVENTION

Waterwheels are designed to use the direct flow of water to rotate a mass, and flywheels are designed to accumulate energy through work done on them by mechanical means and may use a liquid for increasing their relative mass. The current invention uses liquid for both increasing mass for increased rotational energy and as a motive force to drive a rotating shaft. The current invention uses rotating liquid to apply work to a paddle to turn the rotating shaft.

The current invention is a continuous direct motive force to spin a rotating shaft. While the present invention resembles a flywheel storage device, a storage device implies an input of energy and then a passage of time before the energy is converted back into useable work. In the current process described, energy is continuously input in the form of work done on the contained liquid to cause continuous rotation at the same rotational velocity, while simultaneously mechanical energy is continuously extracted in the form of a rotating shaft 4 shown in FIG. 1 and FIG. 2.

Figure 1:
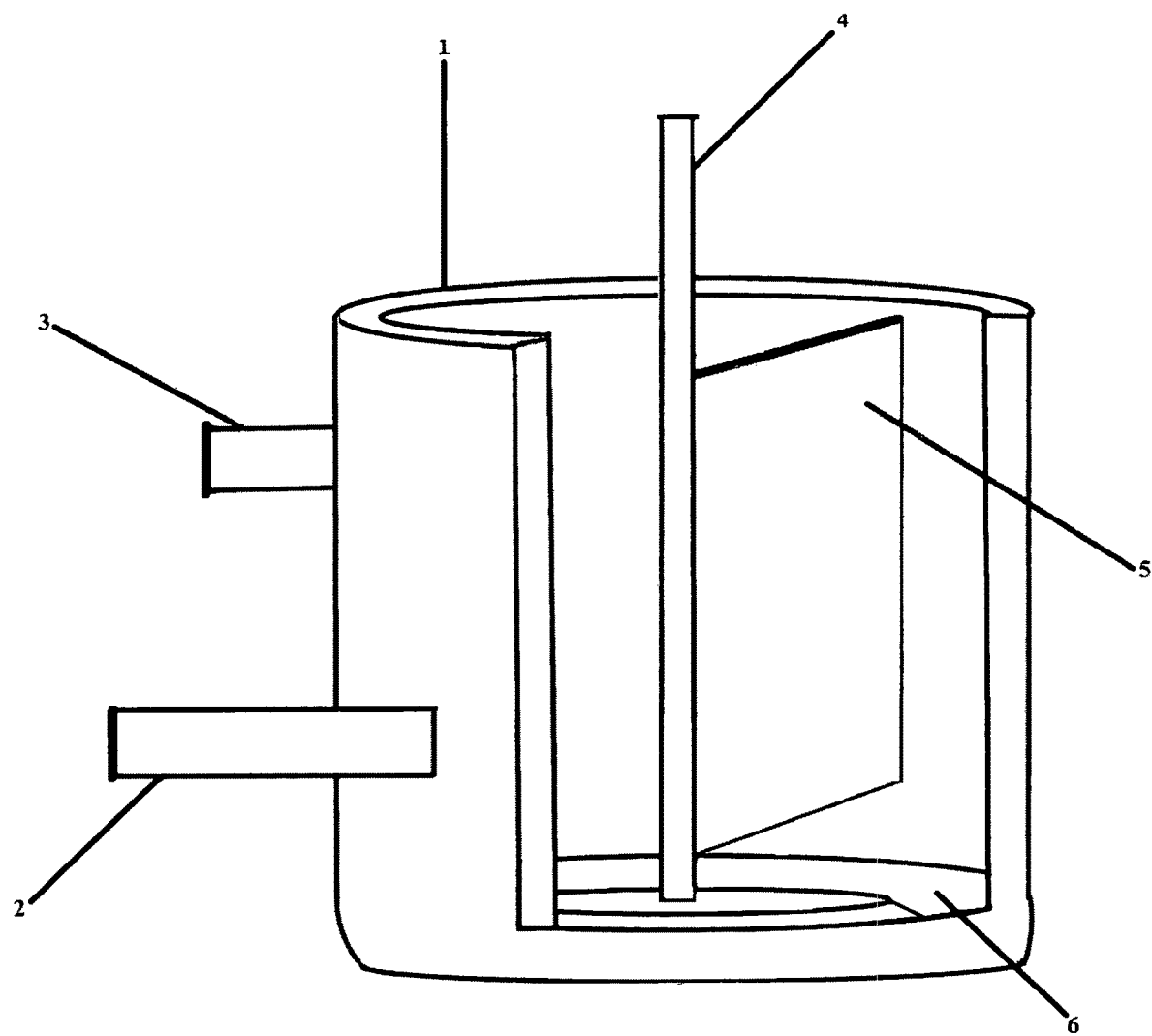
FIG. 1 shows a cutaway view of the parts of one possible embodiment of the invention including a circular container with an inlet and outlet for liquid, a rotating shaft with an affixed paddle and a trough in the bottom of the container.
Figure 2:
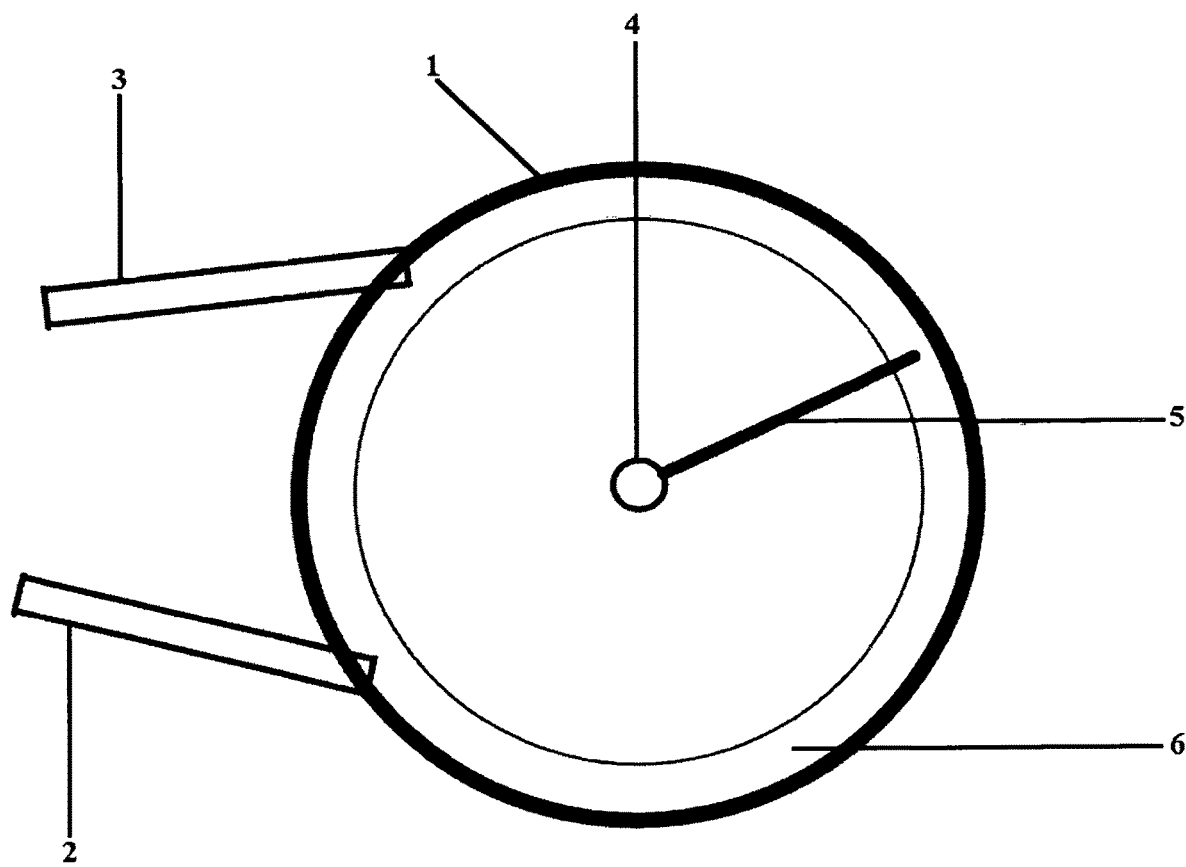
FIG. 2 shows a top view of the parts of one possible embodiment of the invention including a circular container with an inlet and outlet for liquid, a rotating shaft with an affixed paddle, and a trough in the bottom of the container.
Figure 3:
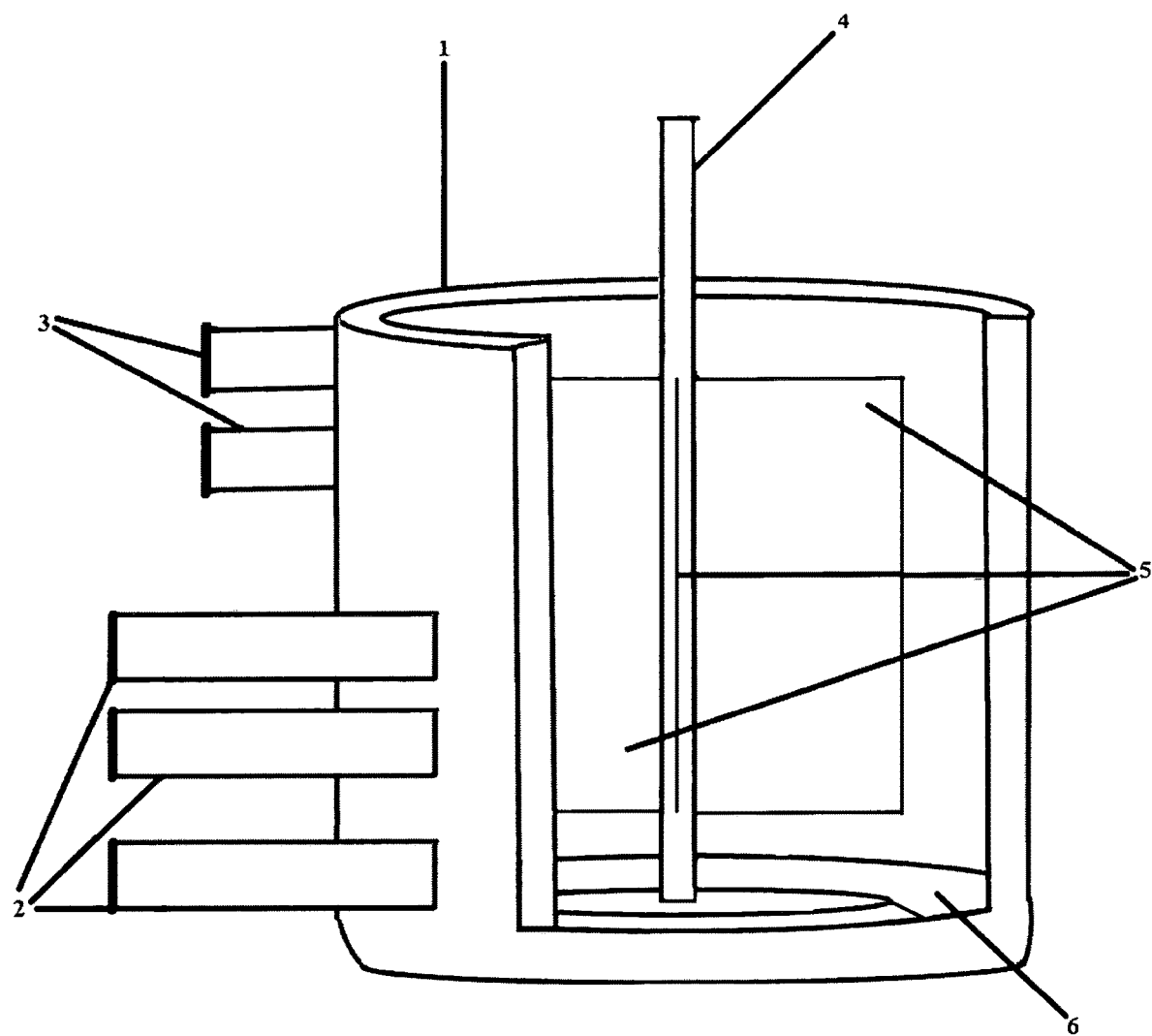
FIG. 3 shows a cutaway view of the parts of one possible embodiment of the invention including a circular container with multiple inlets and multiple outlets for liquid, a rotating shaft with multiple affixed paddles and a trough in the bottom of the container.

The device, shown in FIG. 1 and FIG. 2 is a container 1 with a circular interior sufficient in strength to contain the rotating liquid. The preferred embodiment to impart rotation to the contained liquid is to inject liquid into the container through an inlet 2 aligned tangentially with the interior wall of the container and allow it to exit through an outlet 3 (also aligned tangentially) on the opposite side of the container. Liquid is injected by means of a mechanical pump, gravity flow, or other means that imparts flow to the liquid prior to its entering the container, the energy of the flow is then transferred to the liquid already in the container. The liquid in the container may also be induced to rotation by the application of a force to the rotating shaft. The liquid injected and used throughout the container should be non-compressible. While any number of fluids could work with the process described, the preferred embodiment is water, because it is a non-compressible fluid, abundant, easy to handle and harmless to the environment.

Injected liquid will cause rotation because of the circular nature of the container 1, and if the rotational velocity of the contained liquid is less than the velocity of the incoming liquid, the incoming liquid will perform work on the contained liquid increasing its rotational velocity. This additional work will be translated as increased rotational velocity leading to increased kinetic energy which will be available to perform work. Once the velocity of the rotating liquid and the incoming liquid are equal, the contained liquid will continue to rotate at the same velocity as long as liquid is continually injected into the container at the same velocity and volume that caused the initial rotation to begin and no additional load is applied.

The velocity and volume of the liquid being injected into the container causes rotation. The volume is to be sufficiently large to affect the total volume in the container in a timely manner, and the velocity must be such that it equals or exceeds the rotational speed necessary in conjunction with the mass of the contained liquid to produce the necessary torque (as determined by Torque=$I\omega$) that is needed to produce the desired amount of work.

Rather than have the liquid simply flow through the container, effort is made to retain as much of the liquid as feasible and increase its rotational velocity. For this reason, the outlet 3 for the liquid is specifically placed above the level of the inlet 2. Since the outlet is above the inlet, the majority of the liquid removed from the container is liquid above the inlet 2 and only the liquid that directly aligns with the outlet 3. This reduces the energy needed to remove liquid from the container and allows liquid that is already rotating at maximum velocity to remain in the container.

A paddle 5 is attached to the rotating shaft. Preferably, the paddle 5 is a single bladed rigid paddle with counter weight if needed. The rigid paddle 5 extends from just below the surface of the liquid to just above the bottom of the container provides a rigid surface against which all of the moving liquid molecules can impact, then, transfers the energy of that impact to all of the liquid molecules in front of the paddle through the movement of the paddle. Having a single rigid surface rotating with the liquid works to limit internal turbulence and helps to increase the cohesion of the rotating liquid. It also provides a simple means to allow the rotating liquid in the container to transfer energy and cause rotation in the shaft 4.

Two important design considerations of the present invention are to limit turbulence which degrades rotational energy, and to prevent the formation of a vortex in the rotating liquid. Turbulence can be reduced by the container having smooth, water repellant interior walls. A vortex occurs when the rotational energy moves liquid from the center of the container forcing it against the interior wall and causing the outer edges of the liquid to rise while a depression forms at the center. This can cause a loss of force against the paddle 5. A channel (trough) 6 at the bottom of the container, circling the bottom of the container against the interior wall, equal in depth to the rise of the liquid at the surface caused by the rotation of the liquid, its depth and width based on the designed rotational speed of the liquid, is included in the preferred embodiment to reduce vortex formation.

What is claimed is:

1. A fluid flywheel comprising a liquid chamber having an inner wall and an outer wall, an inlet for allowing a non-compressible liquid to enter, an outlet to allow the liquid to exit, a rotating shaft, and a paddle fixed to the rotating shaft, wherein the paddle is rigid and hollow.

2. The fluid flywheel of claim 1 wherein the inlet comprises multiple inlets and/or the outlet comprises multiple outlets.

3. The fluid flywheel of claim 1 wherein the paddle comprises multiple paddles for extracting mechanical energy.

4. The fluid flywheel of claim 1 having a means of injecting liquid into the liquid chamber by pump, gravity flow, or other mechanical or natural means.

5. The fluid flywheel of claim 1 wherein the liquid is water.

6. The fluid flywheel of claim 1 wherein the liquid is a non-compressible liquid other than water.

7. The fluid flywheel of claim 1 wherein the bottom of the container has a channel running around the inner wall and/or the bottom of the container is curved in an upward direction.

8. The fluid flywheel of claim 1 wherein useful work is done by capturing energy from the liquid within the liquid chamber.

9. The fluid flywheel of claim 1, wherein the outlet is above the inlet causing liquid removed from the chamber to be from above the inlet.

* * * * *